Dec. 6, 1960  R. L. KELSO ET AL  2,963,067
METAL FORMING MACHINE WITH TRAVELING CARRIAGE
SUPPORT FOR WORKPIECE TENSIONING MEANS
Filed April 12, 1957  4 Sheets-Sheet 3 fig-3 fig-4 fig-5

INVENTORS.
R. L. KELSO
C. H. EASLEY
BY George Stett
AGENT

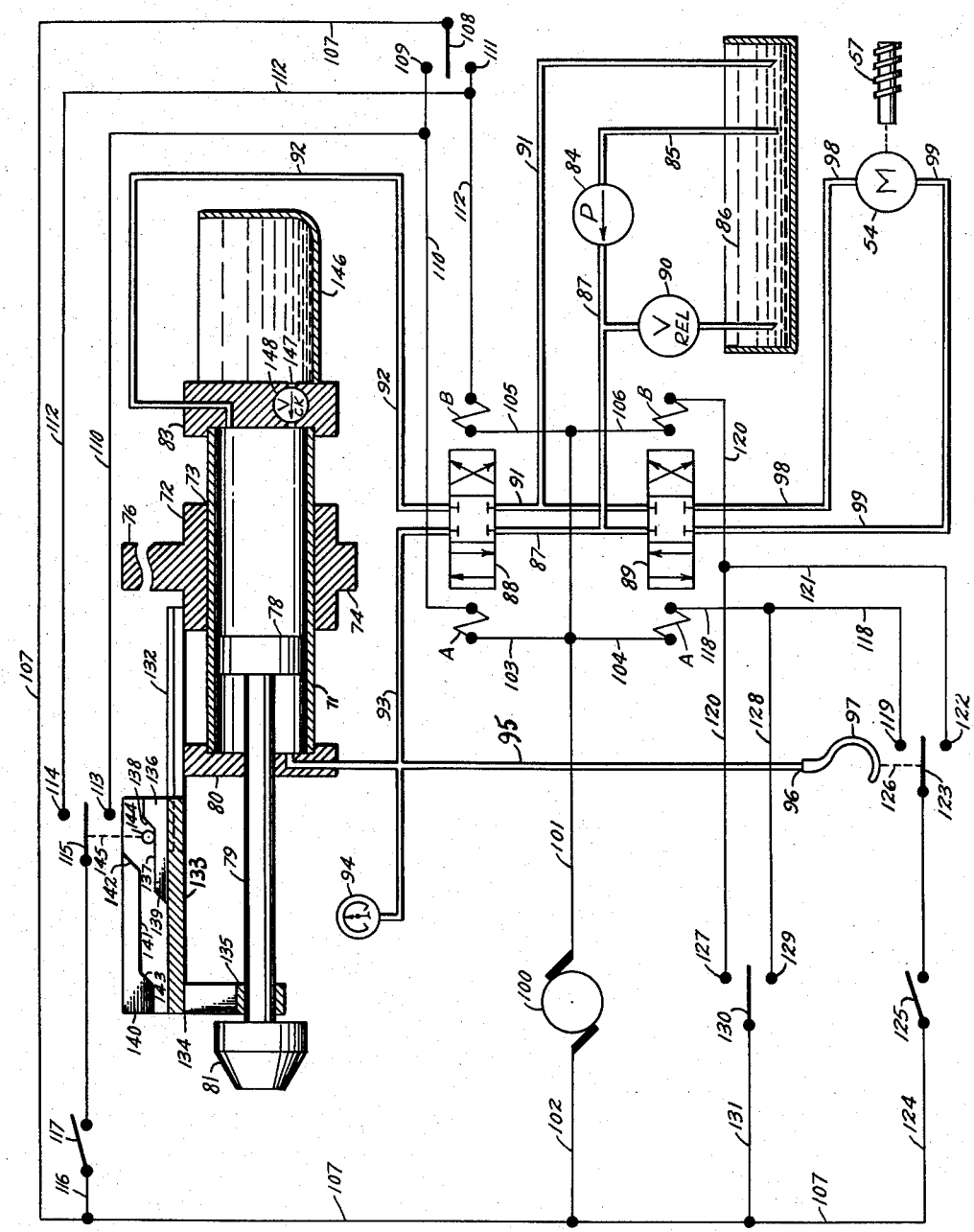

United States Patent Office

2,963,067
Patented Dec. 6, 1960

2,963,067

METAL FORMING MACHINE WITH TRAVELING CARRIAGE SUPPORT FOR WORKPIECE TENSIONING MEANS

Robert L. Kelso and Charles H. Easley, Chula Vista, Calif., assignors to Rohr Aircraft Corporation, San Diego, Calif., a corporation of California Filed Apr. 12, 1957, Ser. No. 652,492

11 Claims. (Cl. 153—40)

This invention relates to a metal forming machine and more particularly to a machine for forming elongated metal workpieces of various cross sections wherein the workpiece is stretched to or slightly beyond its elastic limit and wrapped along the face of a forming die.

In stretch forming metal it is important that the amount of tension applied to the workpiece is carefully controlled so that the metal is stretched sufficiently to permit it to conform smoothly to the shape of the die without being damaged by excessive tension. It is also important that the proper amount of tension be maintained on the workpiece throughout the entire forming operation so that the successive portions of the workpiece coming in contact with the die will conform to and retain the shape of the die.

The stretch forming machines most commonly used are generally provided with a hydraulic cylinder and piston assembly having a piston rod arranged to engage one end of the workpiece to apply the required amount of tension thereto while the workpiece is formed by being wrapped along the face of a rotating die. As the workpiece is wrapped along the die face the piston and piston rod are drawn toward the die in a manner to maintain the proper tension on the workpiece as it is being formed. The metal parts produced by these machines are smoothly and accurately formed, however, since the piston and piston rod must move toward the die a distance equal to the length of the formed portion of the workpiece, the maximum length of the formed portion is limited to the length of the stroke of the cylinder and piston assembly. Thus if parts having a formed portion of extreme length are to be formed the machine must be provided with an equally long cylinder and piston assembly resulting in a large and costly machine which will occupy a large amount of floor space.

It is, therefore, an object of the present invention to provide a stretch forming machine particularly adapted to forming a workpiece having a formed portion of extreme length.

Another object is to provide a stretch forming machine in which the maximum length of the formed workpiece is not limited by the length of the tensioning means stroke.

A further object is to provide a stretch forming machine in which the tensioning means is mounted on a support movable toward and away from the die.

A further object is to provide a movable support for the tensioning means which cooperates with the tensioning means to maintain a substantially uniform and constant predetermined tension on the workpiece during the forming operation.

Another object is to provide a stretch forming machine for stretch forming workpieces of extreme length which is of relatively inexpensive and compact construction.

These and other objects and advantages will become apparent as the description of the invention proceeds.

For a better understanding of the invention reference is made to the accompanying drawing illustrating a preferred embodiment thereof and in which:

Fig. 3 is an end view of the machine.

Fig. 4 is an enlarged view taken on line 4—4 of Fig. 3.

Fig. 5 is an enlarged view taken on line 5—5 of Fig. 2 and

Fig. 6 is a schematic drawing of the machine's electrical and hydraulic systems.

Figure 1:
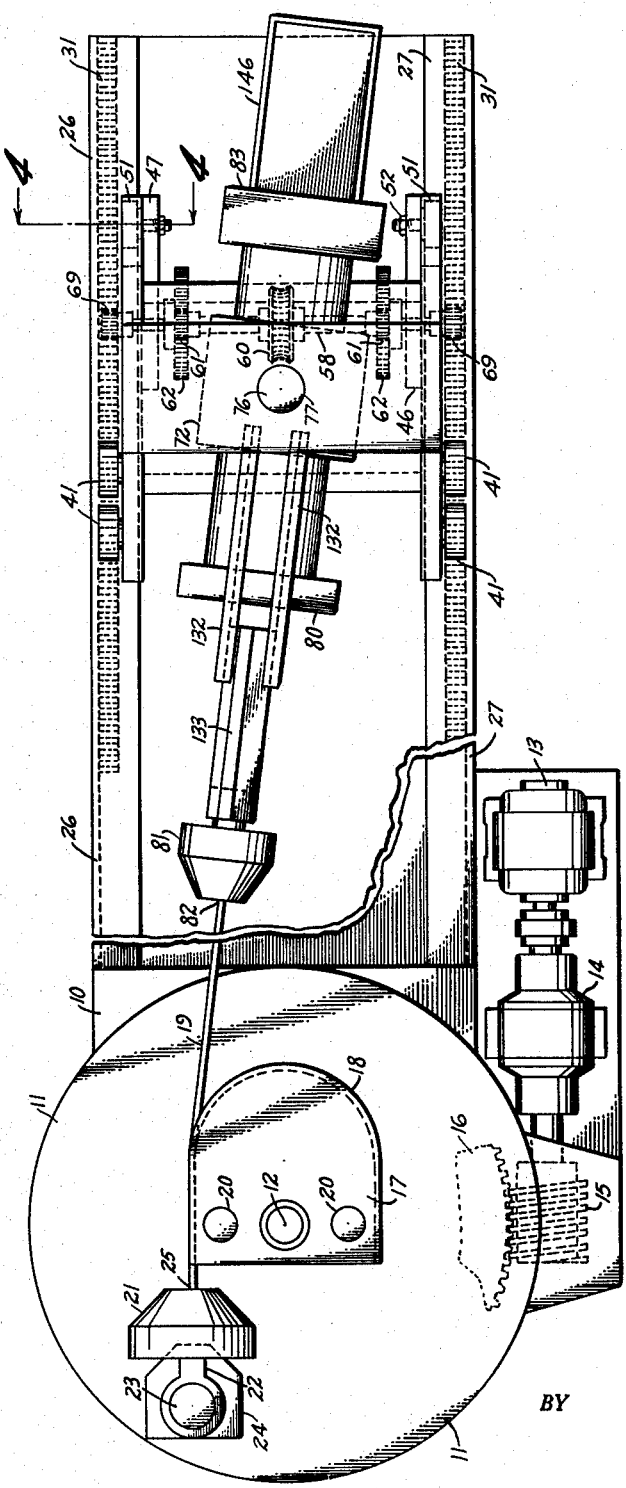
Fig. 1 is a top view of the machine showing a workpiece therein prior to being formed.
Figure 2:
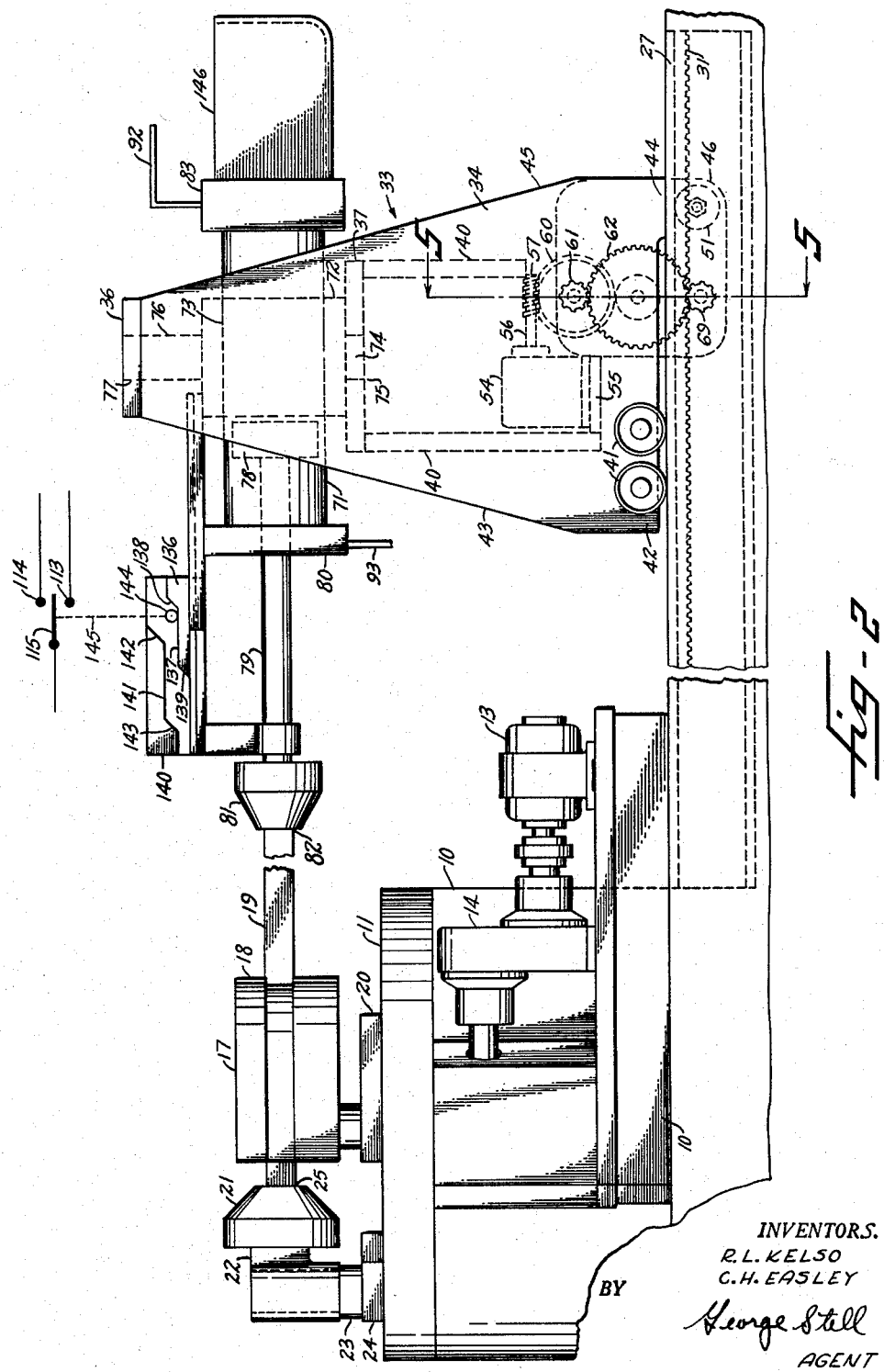
Fig. 2 is a side view of the machine.

With reference to the drawing the machine comprises a base 10 on which a table 11 is mounted for rotation about a vertical axis 12, the table being rotated in either direction by a reversible electric motor 13 through speed reducing gearing (not shown) contained within a gear case 14 and a worm gear 15 in driving engagement with a worm wheel 16 secured to the bottom of table 11. A forming die 17 composed of metal or other hard material and having a curved side face 18 shaped to the form in which the workpiece 19 is to be bent, is attached to table 11 by a supporting means 20 adapted to hold the die slightly above table 11 as shown. A chuck 21 having an extending shank 22 pivotally connected to an upwardly projecting portion 23 of a support 24 attached to table 11, is provided with gripping jaws (not shown) having gripping surfaces shaped to grip the end 25 of the workpiece. A pair of spaced apart and mutually parallel rails 26 and 27 composed of metal and substantially C shaped in section as shown extend perpendicularly from a tangent to table 11 so that they lie on opposite sides of a middle axis extending radially away from table 11. Rails 26 and 27 are preferably contained within an opening 28 in the floor 29 on which base 10 rests, with their upper sides 30 flush with the floor and are secured in position by a known means such as bolts or heavy screws (not shown). Each of the rails is provided with a gear rack 31 secured to the inner surface 32 of side 30, which is about one-half the width of surface 32 and extends along the length of each of the rails for a purpose to be explained. Mounted on rails 26 and 27 is a carriage 33 of strong and rigid construction comprising a pair of side plates 34 and 35 connected together at their upper ends by a top plate 36. A horizontally positioned plate 37 spaced downwardly from plate 36 and parallel thereto extends between the inner surfaces 38 and 39 of side plates 34 and 35 respectively and is secured thereto as by welding. A pair of spaced apart plates 40 positioned vertically under plate 37 also extend between surfaces 38 and 39 and are welded thereto to add rigidity to the carriage and to provide support for plate 37 for a purpose to be explained. Carriage 33 is supported on rails 26 and 27 for movement therealong by a pair of wheels 41 rotatably mounted on the lower ends 42 near the forward edges 43 of each of plates 34 and 35, which engage the upper sides 30 of rails 26 and 27, and by downwardly projecting portions 44 of ends 42 near the rearward edges 45 of plates 34 and 35, and which portions 44 slidably engage upper sides 30 of rails 26 and 27. Attached to inner surfaces 38 and 39 of plates 34 and 35 as by welding are plates 46 and 47 which project downwardly along portions 44 into opening 28 a substantial distance past upper sides 30 of rails 26 and 27. Plates 46 and 47 are provided with openings 48 adjacent their lower ends in each of which a shaft 49 having a threaded end 50 is positioned, each shaft having a wheel 51 rotatably mounted thereon. Shafts 49 are secured in position by threaded nuts 52 in engagement with ends 50 and wheels 51 are of such size that their peripheral surfaces 53 are very close to inner surfaces 32, a small amount of space being allowed between surfaces 53 and 32 for a purpose to be explained. A reversible pressurized fluid operated motor 54 mounted on a suitable supporting plate 55 which extends between and is secured to inner surfaces 38 and 39 of side plates 34 and 35, has a rearwardly extending drive shaft 56 to which a worm gear 57 is secured. A shaft 58 having its ends journaled in aligned openings 59 in plates 46 and 47 has a worm wheel 60 secured thereto in engagement with and adapted to be driven by gear 57 to rotate shaft 58. Attached to shaft 58 adjacent each of its ends and rotatable therewith are gear wheels 61 which are spaced away from plates 46 and 47 and arranged to mesh with and drive a pair of gear wheels 62 which are disposed directly beneath gears 61. Gears 62 are rotatably mounted on shafts 63 secured in aligned openings 64 in plates 46 and 47 and are held in alignment with gears 61 by means of spacers 65 positioned on shafts 63. Plates 46 and 47 are each provided with an opening 66 adjacent the lower end thereof through each of which a shaft 67 passes and is rotatable therein. Shafts 67 each have a pair of gear wheels 68 and 69 attached thereto, gears 68 being in mesh with and adapted to be driven by gears 62 to rotate shafts 67 and gears 69 being in mesh with gear racks 31 along rails 26 and 27. Gears 68 and 69 are held in alignment with gears 62 and gear racks 31 by spacers 70 positioned on shafts 67 on opposite sides of plates 46 and 47. In the above described assembly rotation of shaft 56 through direction of pressurized fluid to motor 54 in a manner to be described, causes worm gear 57 to rotate worm wheel 60, shaft 58, gears 61, 62, 68 and 69 causing gears 69 to move along racks 31 to thereby move carriage 33 along rails 26 and 27 in a desired direction. A hydraulic cylinder 71 is mounted on carriage 33 for pivotal movement about a vertical axis by means of a block 72 having a central bore 73 adapted to receive cylinder 71, block 72 being secured to the cylinder in a position intermediate the ends thereof by a known means such as welding. Block 72 containing cylinder 71 is supported on plate 37 and held in position thereon by means of a downwardly extending cylindrical member 74 connected to block 72 and extending into an opening 75 in plate 37. An upwardly extending cylindrical member 76 connected to block 72 in axial alignment with member 74 extends into an opening 77 in plate 36 to secure block 72 and cylinder 71 in position. Members 74 and 76 may be integral parts of block 72 or connected thereto as by welding and are adapted to slidably engage the walls of opening 75 and 77 to permit pivotal movement of block 72 and cylinder 71 in a horizontal plane. A piston 78 is slidably contained within cylinder 71 and has a piston rod 79 connected thereto and extending out through the end 80 of cylinder 71. Piston rod 79 has a chuck 81 similar to chuck 21, connected to its extending end which is adapted to grip the end 82 of workpiece 19. Fluid under pressure is directed to the head end 83 or rod end 80 of cylinder 71 to move piston 78 and rod 79 in the desired direction in a manner to be described.

With particular reference to Fig. 6 of the drawing the hydraulic system by which cylinder 71 and motor 54 are supplied with fluid under pressure comprises a pump 84 having an intake pipe 85 connected to a fluid reservoir 86 and a discharge pipe 87 connected to a pair of fluid control valves 88 and 89, pipe 87 being provided with a pressure relief valve 90 discharging into reservoir 86. A fluid return pipe 91 is connected to valves 88 and 89 to conduct fluid exhausted by cylinder 71 and motor 54 through valves 88 and 89, to reservoir 86. Cylinder 71 has a pipe 92 extending from head end 83 to valve 88 and a pipe 93 extending from rod end 80 to valve 88, pipe 93 being provided with a fluid pressure gage 94 and having a pipe 95 connected thereto the extending end 96 of which has a bourdon tube 97 connected thereto for a purpose to be explained. Valve 88 is a known type solenoid operated valve which is normally held in a closed position as shown and operated by electrical coils A and B positioned at opposite ends thereof to direct fluid therethrough as desired. By directing electrical current to coil A of valve 88 the valve is moved so that pipes 87 and 92 are connected to direct pressurized fluid to head end 83 of cylinder 71 and pipes 93 and 91 are connected to permit fluid to be exhausted from rod end 80 of cylinder 71 to reservoir 86. By directing current to coil B of valve 88 the valve is moved to connect pipes 87 and 93 to direct pressurized fluid to rod end 80 of cylinder 71 and to connect pipes 91 and 92 to permit fluid to be exhausted from head end 83 of cylinder 71 to reservoir 86. A pair of pipes 98 and 99 are connected to valve 89 and to opposite sides of motor 54 to provide the motor with pressurized fluid for operation. Valve 89 is a known type of solenoid operated valve, similar in construction to valve 88, which is normally in a closed position and operated by electrical coils A and B positioned at opposite ends thereof. By directing electrical current to coil A, valve 89 is moved to position in which pipes 87 and 98 are connected to direct pressurized fluid through pipe 98 to motor 54 causing the motor to rotate in a direction whereby the previously described gear assembly is rotated to move carriage 33 away from die 17 and pipes 91 and 99 are connected to conduct the fluid exhausted by motor 54 back to reservoir 86. By directing current to coil B valve 89 is moved to a position in which pipes 87 and 99 are connected to direct pressurized fluid to motor 54 through pipe 99 causing the motor to rotate in a direction whereby the previously described gear assembly is rotated to move carriage 33 toward die 17 and pipes 91 and 98 are connected to conduct the fluid exhausted by motor 54 back to reservoir 86.

Electrical current is supplied to coils A and B of valves 88 and 89 from a known source 100 through leads 101 and 102 connected thereto. Lead 101 has a line 103 connected thereto which is connected to coil A of valve 88 and a line 104 connected to lead 101 is connected to coil A of valve 89. A line 105 connects coil B of valve 88 to lead 101 and a line 106 connects coil B of valve 89 to lead 101. Lead 102 is connected to a line 107 which terminates at one end in a manually operated switch 108 movable in one direction into contact with a contact point 109 connected to a lead 110 extending from coil A of valve 88 and in the other direction into contact with a contact point 111 connected to a lead 112 extending from coil B of valve 88. Leads 110 and 112 terminate in contact points 113 and 114 which are arranged to be contacted by a switch 115 which is mechanically operated in a manner and for a purpose to be described. Switch 115 is connected to line 107 by a line 116 through a manually operated switch 117. Coil A of switch 89 is provided with a lead 118 terminating in a contact point 119 and coil B of valve 89 is provided with a lead 120 to which a line 121 is connected which terminates in a contact point 122 adjacent point 119. A switch 123 is connected to line 107 by a line 124 through a manually operated switch 125, switch 123 being mechanically connected to bourdon tube 97 as indicated at 126 and movable thereby into contact with points 122 and 119 in a manner to be explained. Lead 120 terminates in a contact point 127 and lead 118 has a line 128 connected thereto which terminates in a contact point 129 adjacent point 127. A manually operated switch 130 connected to line 107 by a line 131 is arranged to be moved in one direction into contact with point 127 and in the other direction into contact with point 129.

To operate the machine for forming workpiece 19 to the shape of face 18 of die 17, table 11 is rotated to position chuck 21 so that when workpiece 19 is held in chucks 21 and 81 prior to being formed it will be tangent to face 18 of die 17 substantially as shown in Fig. 1 of the drawing. End 25 of workpiece 19 is then clamped in chuck 21 and switch 117 in line 116 and switch 125 in line 124 are opened to cut off the flow of current to switch 115 and switch 123. Piston 78 is then positioned intermediate the ends of cylinder 71 by directing pressurized fluid through valve 88 to the rod end or head end of cylinder 71 as necessary to move piston 78 to the desired position. Valve 88 is controlled to direct fluid to cylinder 71 by means of manually operated switch 108 which when moved into contact with contact point 111 causes current to flow through lead 112 to coil B to complete the circuit thereto and thereby move valve 88 to a position in which pipes 87 and 93 and pipes 91 and 92 are connected to direct fluid to the rod end of cylinder 71. By moving switch 108 into contact with contact point 109 current is directed through lead 110 to coil A completing the circuit thereto and thereby moving valve 88 to a position in which pipes 87 and 92 and pipes 91 and 93 are connected to direct fluid to the head end of cylinder 71. When piston 78 has been positioned intermediate the ends of cylinder 71 carriage 33 is moved along rails 26 and 27 by directing pressurized fluid through valve 89 to motor 54, to a position in which end 82 of workpiece 19 may be engaged by chuck 81. Valve 89 is controlled to direct pressurized fluid to motor 54 to move carriage 33 in the desired direction along rails 26 and 27 by means of manually operated switch 130. By moving switch 130 into contact with contact point 127 the electrical circuit to coil B is completed through lead 120 to thereby move valve 89 to a position in which pipes 87 and 99 and pipes 91 and 98 are connected to direct pressurized fluid to motor 54 to cause it to rotate in the direction necessary to rotate the gears connected thereto in a direction to move carriage 33 along rails 26 and 27 toward die 17. By moving contact switch 130 into contact with contact point 129 current is permitted to flow through line 128 and lead 118 to complete the circuit to coil A thereby moving valve 89 to a position in which pipes 87 and 98 and pipes 91 and 99 are connected to direct fluid to motor 54 causing the motor to rotate in a direction whereby the gears connected thereto are rotated in a manner to move carriage 33 along rails 26 and 27 away from die 17. When carriage 33 is positioned so that end 82 of workpiece 19 may be secured in chuck 81, switch 130 is moved to a neutral position between contact points 127 and 129 permitting valve 89 to assume a closed position to stop further movement of carriage 33. Switch 108 is then moved into contact with contact point 111 to thereby operate valve 88 and direct pressurized fluid to rod end 80 of cylinder 71 in the manner previously described. Pressurized fluid is directed to rod end 80 until the pressure within the rod end of cylinder 71, as indicated on gage 94, is sufficient to urge piston 78 and piston rod 79 toward head end 83 with a force which will apply a predetermined amount of tension to workpiece 19 to stretch it to or slightly beyond its elastic limit. Switch 108 is then moved to a neutral position between contact points 109 and 111 allowing valve 88 to close. The tension applied to workpiece 19 by piston 78 causes carriage 33 to tilt slightly toward die 17 so that wheels 41 are urged downwardly against tracks 26 and 27 and wheels 51 are drawn upwardly against surfaces 32 of tracks 26 and 27. Downwardly projecting portions 44 of plates 34 and 35 move upwardly a slight distance away from rails 26 and 27 so that carriage 33 is held and supported on the rails by wheels 41 and 51 and may be easily moved therealong by rotation of motor 54. The pressurized fluid directed to rod end 80 of cylinder 71 also enters pipe 95 and bourdon tube 97 thereby causing tube 97 to uncurl or straighten somewhat in response to the pressure. Linkage 126 connecting tube 97 and switch 123 is then adjusted so that switch 123 is positioned midway between contact points 119 and 122 and switch 125 in line 124 is closed to permit current to flow from line 107 through line 124 to switch 123. Table 11 is then rotated to rotate die 17 and chuck 21 to thereby wrap workpiece 19 along die face 18 to form the workpiece. The pivotal mounting of cylinder supporting block 72 permits cylinder 71 to pivot in a horizontal plane about the axes of pins 74 and 76 and thereby remain in axial alignment with the unformed portion of workpiece 19 as the workpiece is wrapped along die face 18. Tension is thus applied to the unformed portion of workpiece 19 in a direct line tangent to face 18 during the forming operation to prevent buckling or damaging the workpiece. As the workpiece is wrapped along die 17 by rotation of the die, end 82 of the workpiece is drawn toward the die thereby increasing the tension on the workpiece and drawing piston 78 toward the rod end of cylinder 71 which increases the pressure of the fluid contained in rod end 80 and pipe 95. The increase in the pressure of the fluid causes bourdon tube 97 to further uncurl moving switch 123 into contact with contact point 122 thus permitting current to flow from switch 123 through line 121 and lead 120 to coil B of valve 89. Completing the circuit to coil B positions valve 89 to direct pressurized fluid to motor 54 to move carriage 33 toward die 17 as previously explained, so that the tension on workpiece 19 is diminished thereby reducing the pressure of the fluid in rod end 80 and pipe 95. The reduction of pressure allows bourdon tube 97 to curl upwardly and move switch 123 away from contact point 122 thereby stopping the flow of current to coil B and allowing valve 89 to close and stop the movement of carriage 33. In the event that the pressure of the fluid in rod end 80 of cylinder 71 falls below that required to maintain the proper amount of tension on workpiece 19 the drop in pressure will cause bourdon tube 97 to curl upwardly moving switch 123 into contact with contact point 119 thereby directing current through lead 118 to coil A of valve 89. Completing the circuit to coil A positions valve 89 to direct pressurized fluid to motor 54 to move carriage 33 away from die 17, as previously explained, thereby increasing the tension on workpiece 19 and causing piston 78 to be drawn toward rod end 80 so that the pressure of the fluid in rod end 80 is increased. When carriage 33 has moved a sufficient distance so that the proper amount of tension is again being applied to the workpiece as indicated by the pressure of the fluid in rod end 80, the increase in pressure will cause bourdon tube 97 to uncurl and move switch 123 away from contact point 119 to stop the flow of current to coil A permitting valve 89 to close and stop further movement of the carriage. Thus as workpiece 19 is being formed any change in the pressure of the fluid in cylinder 71, indicating a corresponding change in the amount of tension being applied to the workpiece, is compensated for by movement of carriage 33 in the proper direction to maintain a substantially uniform tension on the workpiece throughout the forming operation.

Piston 78 is retained in a position intermediate ends 80 and 83 of cylinder 71 and prevented from moving into contact with the ends of the cylinder by means of a control comprising a pair of guides 132 secured to block 72 and end 80 of cylinder 71. A plate 133 is slidably supported on guides 132 and has one end 134 connected to piston rod 79 by means of a yoke 135 so that movement of piston rod 79 causes a corresponding movement of plate 133. Attached to plate 133 is a member 136 having a horizontal surface 137 disposed between upwardly and downwardly inclined surfaces 138 and 139. A member 140, similar to member 136, is attached to plate 133 and has a horizontal surface 141 disposed between upwardly and downwardly inclined surfaces 142 and 143. A follower 144, mechanically connected to switch 115 by suitable linkage indicated at 145, is in contact with and moved upwardly or downwardly by members 136 and 140 to operate switch 115 in response to excessive outward or inward movement of piston rod 79. Members 136 and 140 are positioned so that piston 78 is permitted to move within cylinder 71 without being controlled when follower 144 is in contact with horizontal surfaces 137 and 141, switch 115 being held in a neutral position midway between contact points 113 and 114 by linkage 145. In the event that piston 78 is moved toward rod end 80 of cylinder 71 causing piston rod 79 to move outwardly, upwardly inclined surface 138 of member 136 will engage follower 144 moving it upwardly thereby moving switch 115 into contact with contact point 114. This will allow current to flow from line 107 through line 116 switch 117 and switch 115 through lead 112 to coil B of valve 88 positioning the valve to direct pressurized fluid to rod end 80, as previously described, to urge piston 78 toward head end 83. The additional pressure produced in rod end 80 by directing pressurized fluid thereto will cause bourdon tube 97 to uncurl moving switch 123 into contact with contact point 122 thereby causing carriage 33 to move toward die 17, in the manner before described, to compensate for the increased pressure and prevent an increase in the tension applied to workpiece 19. As piston 78 and piston rod 79 move toward the head end of cylinder 71 follower 144 is engaged by inclined surface 142 of member 140 and moved downwardly to horizontal surface 137 thereby moving switch 115 to stop the flow of current to coil B and allowing valve 88 to close. With the flow of pressurized fluid to end 80 of cylinder 71 stopped the decrease in pressure in end 80 caused by movement of carriage 33 toward die 17 will cause bourdon tube 97 to curl upwardly moving switch 123 away from contact point 122 to stop the movement of the carriage. In the event that piston 78 is moved toward head end 83 of cylinder 71 causing piston rod to move inwardly, follower 144 will be engaged by and moved downwardly by downwardly inclined surface 143 of member 140 causing switch 115 to move downwardly into contact with contact point 113. This will allow current to pass through lead 110 to coil A of valve 88 positioning the valve to direct pressurized fluid to head end 83 of cylinder 71, as previously described, to urge piston 78 toward rod end 80. The decrease in pressure in rod end 80 caused by fluid being exhausted therefrom while fluid is directed to head end 83 will cause bourdon tube 97 to curl upwardly thereby moving switch 123 into contact with contact point 119 causing carriage 33 to move away from die 17, in the manner previously described, to maintain the proper tension on workpiece 19 while piston 78 moves toward head end 83. As piston 78 moves toward end 80 of cylinder 71 and rod 79 moves outwardly moving plate 133 with it, follower 144 is engaged and moved upwardly by inclined surface 139 of member 136 thereby moving switch 115 upwardly away from contact 113 to stop the flow of current to coil A and permitting valve 88 to close. The increase in pressure in rod end 80 caused by the continued movement of carriage 33 away from die 17 causes bourdon tube 97 to uncurl moving switch 123 away from contact point 119 to stop the movement of the carriage.

A tank 146 secured to the head end 83 of cylinder 71 and adapted to contain a fluid, has an outlet 147 extending into cylinder 71 which is provided with a check valve 148 through which fluid is allowed to pass from tank 146 to cylinder 71 only. Thus if piston 78 moves toward end 80 of cylinder 71 while valve 88 is in a closed position fluid is permitted to enter head end 83 to prevent the possibility of a vacuum being created in the head end of the cylinder which would resist movement of the piston toward head end 80 and have the result of increasing the amount of tension being applied to workpiece 19 without increasing the pressure of the fluid in rod end 80 of cylinder 71.

Upon completion of the forming operation switches 117 and 125 are opened to stop the flow of current from line 107 to switches 115 and 123 and carriage 33 is moved toward die 17 by means of manually operated switch 130 in the manner before described, to relieve the tension on workpiece 19. Ends 25 and 82 are then disengaged from chucks 21 and 81 and the formed workpiece removed from die 17.

Rails 26 and 27 may be of any desired length to accommodate workpieces of various lengths and by providing a suitable covering for opening 28 in floor 29 the presence of the rails extending along the floor does not interfere with the use of floor space in the area surrounding the machine.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. A combined metal stretching and forming machine adapted to conform an elongated workpiece to the shape of a forming die, comprising: a base; a rotary forming die having a face shaped to a desired contour; means supported on said base for rotating said die; means for holding one end of the workpiece disposed adjacent said die for rotation therewith; a chuck adapted to engage and grip the other end of the workpiece; a tensioning means connected to said chuck for applying a predetermined tension to the workpiece to stretch the workpiece; a carriage having said tensioning means and chuck supported thereon for movement on said base toward and away from said die; carriage driving means including a reversible motor operatively connected to said tensioning means, and means operable in response to variations from said predetermined tension applied to the workpiece for selectively operating said motor to move said carriage toward and away from the die to maintain a substantially uniform tension on the workpiece as the workpiece is wrapped along the die face.

2. A combined metal stretching and forming machine adapted to conform an elongated workpiece to the shape of a forming die, comprising: a base; a rotary forming die having a face shaped to a desired contour; means supported on said base for rotating said die; means for holding one end of the workpiece disposed adjacent said die and rotatable therewith; a gripping means adapted to grip the other end of the workpiece; a fluid operated cylinder and piston assembly connected to said gripping means for applying initial predetermined tension to the workpiece prior to rotation of said die; a carriage arranged and constructed to support said cylinder and piston assembly for movement on said base toward and away from said die; carriage driving means including a reversible motor, and means operable in response to variations in the fluid pressure within said cylinder and piston assembly from said predetermined tension for selectively operating said motor to move said carriage toward and away from said die to maintain a substantially uniform tension on said workpiece as the workpiece is wrapped along the die face.

3. A combined metal stretching and forming machine adapted to conform an elongated workpiece to the shape of a forming die, comprising: a base; a rotary forming die having a side face of desired contour; means supported on said base for rotating said die about a vertical axis; means for holding one end of the workpiece disposed adjacent said die rotatable therewith; a fluid operated cylinder and piston assembly connected to the other end of the workpiece for applying an initial predetermined tension to the workpiece prior to rotation of said die; a carriage supporting said cylinder and piston assembly for pivotal movement about a vertical axis and for movement toward and away from said die; a reversible power means for moving said carriage toward and away from said die; and means responsive to variations in the fluid pressure within said cylinder and piston assembly from said predetermined tension for actuating said power means to selectively move said carriage toward and away from said die to maintain a substantially uniform tension on said workpiece as the workpiece is wrapped along the die face.

4. A combined metal stretching and forming machine adapted to conform an elongated workpiece to the shape of a forming die, comprising: a base; a rotary forming die having a side face of desired contour; means on said base supporting said die for rotation about a vertical axis; a gripping means disposed adjacent said die and rotatable therewith adapted to grip one end of the workpiece; a chuck adapted to grip the other end of the workpiece; a tensioning means connected to said chuck for applying a predetermined tension to the workpiece; guide means supported on said base and extending radially from said axis of rotation; a carriage mounted on said guide means for movement therealong, means on said carriage supporting said tensioning means for pivotal movement about a vertical axis; means for rotating said die to wrap the workpiece along said die face; and carriage driving means including a reversible motor operatively connected to said tensioning means and operable in response to variations from said predetermined tension applied to the workpiece to move said carriage along said guide means in the required direction to maintain a substantially uniform tension on the workpiece as the workpiece is wrapped along said die face.

5. A combined metal stretching and forming machine adapted to conform an elongated workpiece to the shape of a forming die comprising: a base; a rotary forming die having a side face of desired contour; a table supported on said base for rotation about a vertical axis and adapted to support said die for rotation therewith; a gripping means attached to said table adjacent said die for rotation therewith adapted to grip one end of the workpiece; guide means supported on said base and extending radially from said axis of rotation; a carriage mounted on said guide means for movement along said guide means toward and away from said table; a tensioning means supported on said carriage for movement therewith and for pivotal movement about a vertical axis, said tensioning means having means for engaging the other end of the workpiece and for applying a predetermined amount of tension to the workpiece; means for rotating said table to wrap the workpiece along said die face; reversible power means for moving said carriage along said guide means toward and away from said table; and means responsive to variations from said predetermined tension applied to the workpiece for actuating said power means to move said carriage along said guide means in the required direction to maintain a substantially uniform tension on the workpiece as the workpiece is wrapped along said die face.

6. A combined metal stretching and forming machine adapted to conform an elongated workpiece to the shape of a forming die, comprising: a base; a rotary forming die having a side face of desired contour; a table supported on said base for rotation about a vertical axis and adapted to support said die for rotation therewith; a chuck attached to said table adjacent said die, said chuck being arranged to grip one end of the workpiece; a pair of guide rails supported on said base and having a middle axis extending radially from said axis of rotation; a carriage mounted on said rails for movement therealong; a reversible pressurized fluid operated motor mounted on said carriage operatively connected to said guide rails for moving said carriage toward and away from said table; a pressurized fluid operated tensioning means supported by said carriage for pivotal movement about a vertical axis, said tensioning means being adapted to engage the other end of said workpiece; means for supplying fluid pressure to said tensioning means to apply a predetermined initial tension to the workpiece; means for rotating said die supporting table to wrap the workpiece along said die; and means responsive to variations in the pressure of the fluid within said tensioning means from said predetermined tension for directing pressurized fluid to said motor to thereby move said carriage in the required direction to maintain a substantially uniform tension on the workpiece as the workpiece is wrapped along said die face.

7. A combined metal stretching and forming machine adapted to conform an elongated workpiece to the shape of a forming die, comprising: a base; a rotary forming die having side face of desired contour; means on said base for supporting said die for rotation about a vertical axis; a chuck adapted to grip one end of the workpiece connected to said die supporting means for rotation therewith; a pair of guide rails supported on said base and having a middle axis extending radially from said axis of rotation; a carriage positioned on said guide rails for movement therealong; a hydraulic fluid operated cylinder and piston assembly pivotally supported on said carriage for movement therewith and for pivotal movement about a vertical axis, means for connecting the piston rod of said cylinder and piston assembly to the other end of said workpiece; means for rotating said die to wrap the workpiece along the die face; means for directing pressurized hydraulic fluid into said cylinder and piston assembly to apply a predetermined initial tension to the workpiece and resist movement of the workpiece toward said die to thereby stretch the workpiece; carriage driving means including a reversible fluid motor mounted on said carriage and having driving connections with said rails, and means responsive to variations in the fluid pressure within said cylinder and piston assembly from said predetermined tension for operating said fluid motor to move said carriage along said guide rails in the direction necessary to maintain a substantially uniform pressure on the fluid within said cylinder and piston assembly as the workpiece is wrapped along said die face.

8. In a combined metal stretching and forming machine adapted to conform an elongated workpiece to the shape of a forming die, means for applying a substantially constant predetermined tension to the workpiece throughout the forming operation, comprising: a fluid operated tensioning means adapted to be connected to one end of the workpiece; a traveling carriage supporting said tensioning means for movement toward and away from the die; means for supplying pressurized fluid to said tensioning means to apply a predetermined tension to the workpiece; reversible carriage driving means, and means responsive to variations in the pressure of the fluid within said tensioning means from said predetermined tension for selectively operating said driving means to move said carriage toward and away from the die.

9. In a combined metal stretching and forming machine adapted to conform an elongated workpiece to the shape of a rotary forming die, means for applying a substantially constant predetermined tension to the workpiece throughout the forming operation, comprising: a fluid operated tensioning means adapted to be connected to one end of the workpiece; guide means extending radially from the axis of rotation of said die; means for supporting said tensioning means positioned on said guide means for movement therealong toward and away from said die; reversible power means mounted on said supporting means and operatively connected to said guide means for moving said supporting means along said guide means; means for supplying pressurized fluid to said tensioning means to apply a predetermined tension to said workpiece; and means responsive to variations in the pressure of the fluid within said tensioning means from said predetermined tension for actuating said power means to selectively move said supporting means toward and away from the die.

10. In a combined metal stretching and forming machine adapted to conform an elongated workpiece to the shape of a forming die, means for applying a substantially constant predetermined tension to the workpiece throughout the forming operation, comprising: a fluid operated cylinder and piston assembly having a piston rod connected to one end of the workpiece; means for supporting said cylinder and piston assembly for pivotal movement about a vertical axis intermediate the ends thereof and for movement toward and away from the die; means for directing pressurized fluid into said cylinder and piston assembly to move said piston and thereby apply a predetermined tension to the workpiece; reversible power means mounted on said supporting means for selectively moving said supporting means toward and away from said die; and means responsive to variations in the pressure of the fluid within said cylinder and piston assembly from said predetermined tension for actuating said power means to selectively move said supporting means toward and away from the die.

11. In a machine wherein an elongated workpiece is wound about a rotating member having power means for rotating the same, means for applying a substantially constant predetermined tension to the unwound portion of the workpiece during the winding operation, comprising: a fluid operated tensioning means connected to one end of the workpiece for applying a predetermined tension thereto; means for supporting said tensioning means for movement toward and away from said rotating member; reversible power means mounted on said supporting means for moving said supporting means toward and away from said rotating member; and means responsive to variations in the fluid pressure within said tensioning means from said predetermined tension for actuating said power means to selectively move said supporting means toward and away from said rotating member.

References Cited in the file of this patent

UNITED STATES PATENTS

| | | |
|---|---|---|
| 2,411,801 | Nielsen | Nov. 26, 1946 |
| 2,412,731 | Hoffman | Dec. 17, 1946 |
| 2,437,092 | Greene | Mar. 2, 1948 |
| 2,514,830 | Bath | July 11, 1950 |
| 2,514,831 | Bath | July 11, 1950 |
| 2,536,738 | Green | Jan. 2, 1951 |
| 2,676,638 | Wheeler | Apr. 27, 1954 |
| 2,713,376 | Bath | July 19, 1955 |
| 2,857,952 | Hein | Oct. 28, 1958 |

FOREIGN PATENTS

| | | |
|---|---|---|
| 984,974 | France | Mar. 7, 1951 |